United States Patent
Li et al.

(10) Patent No.: US 9,910,694 B2
(45) Date of Patent: *Mar. 6, 2018

(54) PROVIDING A CUSTOM VIRTUAL APPLIANCE

(71) Applicant: International Business Machines Corporation, Armonk, NY (US)

(72) Inventors: Lei Li, Beijing (CN); Xin Peng Liu, Beijing (CN); Lei Qin, Shanghai (CN); Jian Shu, Beijing (CN); Xi Ning Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/090,644

(22) Filed: Apr. 5, 2016

(65) Prior Publication Data

US 2016/0217000 A1 Jul. 28, 2016

Related U.S. Application Data

(63) Continuation of application No. 14/453,114, filed on Aug. 6, 2014, now Pat. No. 9,348,570.

(30) Foreign Application Priority Data

Aug. 20, 2013 (CN) .......................... 2013 1 0364810

(51) Int. Cl.
*G06F 9/455* (2006.01)
*G06F 9/445* (2018.01)

(52) U.S. Cl.
CPC ............ *G06F 9/45558* (2013.01); *G06F 8/60* (2013.01); *G06F 2009/45562* (2013.01)

(58) Field of Classification Search
CPC .................................................. G06F 9/45558
See application file for complete search history.

(56) References Cited

U.S. PATENT DOCUMENTS

| | | |
|---|---|---|
| 2005/0198303 A1 | 9/2005 | Knauerhase et al. |
| 2011/0154320 A1 | 6/2011 | Verma |
| 2011/0265076 A1 | 10/2011 | Thorat et al. |
| 2011/0265087 A1 | 10/2011 | Chen et al. |
| 2011/0314466 A1 | 12/2011 | Berg et al. |
| 2012/0084769 A1* | 4/2012 | Adi .......................... G06F 8/63 717/174 |

(Continued)

FOREIGN PATENT DOCUMENTS

| | | |
|---|---|---|
| CN | 101546270 A | 9/2009 |
| CN | 103092650 A | 5/2013 |

OTHER PUBLICATIONS

C. Peng et al., "VDN: Virtual Machine Image Distribution Network for Cloud Data Centers", IEEE, Proceedings IEEE Infocom, 2012, pp. 181-189.

(Continued)

*Primary Examiner* — Charlie Sun
(74) *Attorney, Agent, or Firm* — Law Office of Jim Boice (57) ABSTRACT

A method, system, and/or computer program product provide a custom virtual appliance. One or more processors generate a description file of a custom virtual appliance based on a user requirement. The processor(s) acquire configuration metadata of the custom virtual appliance from the description file. The processor(s) create a list of candidate virtual appliances based on the configuration metadata. The processor(s) acquire a disk size of the custom virtual appliance based on configuration metadata. The processor(s), for a specific virtual appliance in the list: acquire a disk size of the specific virtual appliance; and determine, based on the disk size conversion information, whether the specific virtual appliance is required to convert a disk size of the custom virtual appliance. In response to determining that a candidate virtual appliance from the list is required to convert the virtual disk, the processor(s) construct the candidate virtual appliance as the custom virtual appliance.

12 Claims, 5 Drawing Sheets

(56) References Cited

U.S. PATENT DOCUMENTS

| | | | |
|---|---|---|---|
| 2012/0131578 A1* | 5/2012 | Ciano | G06F 9/45558 718/1 |
| 2012/0266170 A1 | 10/2012 | Zimmerman et al. | |
| 2013/0111467 A1* | 5/2013 | Sundararaj | G06F 9/505 717/176 |
| 2013/0132951 A1 | 5/2013 | Shah | |
| 2013/0152080 A1 | 6/2013 | Sachindran et al. | |
| 2013/0167148 A1* | 6/2013 | Lee | G06F 9/45558 718/1 |
| 2014/0059544 A1 | 2/2014 | Koganty et al. | |
| 2014/0149695 A1 | 5/2014 | Zaslavsky et al. | |
| 2014/0245301 A1 | 8/2014 | Cheng et al. | |

OTHER PUBLICATIONS

M. Schmidt et al, "Efficient Distribution of Virtual Machines for Cloud Computing", IEEE, 18th Euromicro International Conference on Parallel, Distributed and Network-Based Processing (PDP), 2010, pp. 567-574.

Di Wu et al., "On P2P Mechanisms for VM Distribution in Cloud Data Centers: Modeling, Analysis and Improvement", IEEE, 4th International Conference on Cloud Computing Technology and Science, 2012, pp. 50-57.

R. Wartel et al., "Image Distribution Mechanisms in Large Scale Cloud Providers" IEEE, Second International Conference on Cloud Computing Technology and Science (Cloudcom), 2010, pp. 112-117 (Abstract Only).

Anonymous, "Mergetorrent—Combine/Merge Multiple Torrents Into One", <code.google.com/p/mergetorrent>, Retrieved Aug. 6, 2014, pp. 1-2.

Anonymous, "Torrent File" Wikimedia Foundation, Inc., wikipedia.org, Retrieved Aug. 6, 2014, pp. 1-6.

Anonymous, "Virtualbox Virtual Appliances", <ovfappliances.com>, Retrieved Aug. 6, 2014, pp. 1-3.

G. Ammons et al., "Virtual Machine Images as Structured Data: The Mirage Image Library" USENIX Association, Proceedings of the 3rd USENIX Workshop on Hot Topics in Cloud Computing, Jun. 14-15, 2011, Portland, OR, pp. 1-6.

* cited by examiner

# PROVIDING A CUSTOM VIRTUAL APPLIANCE

BACKGROUND

The present invention relates to virtual appliances. More specifically, the present invention relates to a method and device for providing a custom virtual appliance.

With the development of virtualization technology, a virtual machine is capable of providing various applications and services just like a real and standalone computer. On this basis, one or more virtual machines may be packaged together to provide a pre-constructed software environment, thereby forming a virtual appliance. For example, in one example, three virtual machines VM1, VM2 and VM3 may be utilized to construct a virtual appliance, wherein the three virtual machines being installed thereon different software programs respectively, so as to execute different functions respectively. For example, virtual machine VM1 may be used to execute various applications, VM2 may be used to provide a database, and VM3 may function as a proxy server. These "dedicated" virtual machines are packaged together to jointly provide a complete running environment, thereby forming a virtual appliance. In such a case, the plurality of virtual machines forming the virtual appliance is taken as a whole, so that they are maintained, updated and managed together.

In order to form a required virtual appliance, a variety of specifications and approaches for packaging virtual machines are set forth in prior art. Nowadays, OVF (Open Virtualization Format) is a commonly used specification for packaging and distributing virtual appliance. With OVF specification, virtual appliances may be installed and deployed across platforms in a simple and flexible manner. According to OVF specification, multiple virtual machines are packaged into one OVF package. Typically, an OVF package contains an OVF description file with suffix .ovf and optionally contains a manifest file with suffix .mf and a certificate file with suffix .cert. The OVF description file is used to describe configuration information of various virtual machines contained in that OVF package. Additionally, an OVF package also contains disk image files of various virtual machines forming a virtual appliance. These files store data in virtual disks in form of images.

According to user's requirement on various virtual appliances, many data centers are configured to, based on user requirement, provide user with virtual appliance in form of OVF package, for example. In particular, under cloud computing environment, especially under Infrastructure as a Service (IaaS) mode, a cloud data center may provide various virtual machines and virtual appliances to a variety of users. Due to user's different requirements on various virtual appliances such as the different virtual disk format or size, the virtualization format (e.g. VMware format, or XEN format), etc, virtual appliances built in the data center often cannot meet user's actual expectation. In particular, in a cloud computing environment, there is variation in requirements from different users or in requirements of a same user under different contexts, and such variability results in that the provided limited virtual appliances cannot meet the requirements.

SUMMARY

A method, system, and/or computer program product provide a custom virtual appliance. One or more processors generate a description file of a custom virtual appliance based on a user requirement. The processor(s) acquire configuration metadata of the custom virtual appliance from the description file. The processor(s) create a list of candidate virtual appliances based on the configuration metadata by using conversion information, where the candidate virtual appliances in the list are capable of converting to a configuration that corresponds to the configuration metadata. The processor(s) acquire a disk size of the custom virtual appliance based on configuration metadata of the custom virtual appliance. The processor(s), for a specific virtual appliance in the list: acquire a disk size of the specific virtual appliance; and determine, based on the disk size conversion information, whether the specific virtual appliance is required to convert a disk size of the custom virtual appliance by performing a disk size conversion on the specific virtual appliance. In response to determining that a candidate virtual appliance from the list is required to convert the virtual disk on the candidate virtual appliance using the disk format conversion information, the processor(s) download and construct the candidate virtual appliance as the custom virtual appliance.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
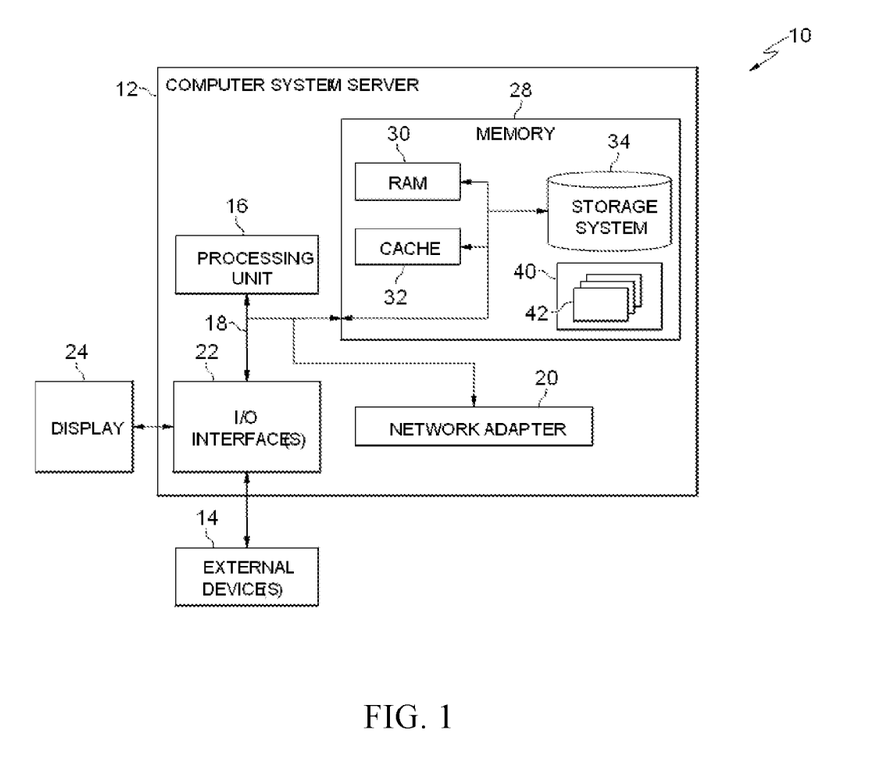
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
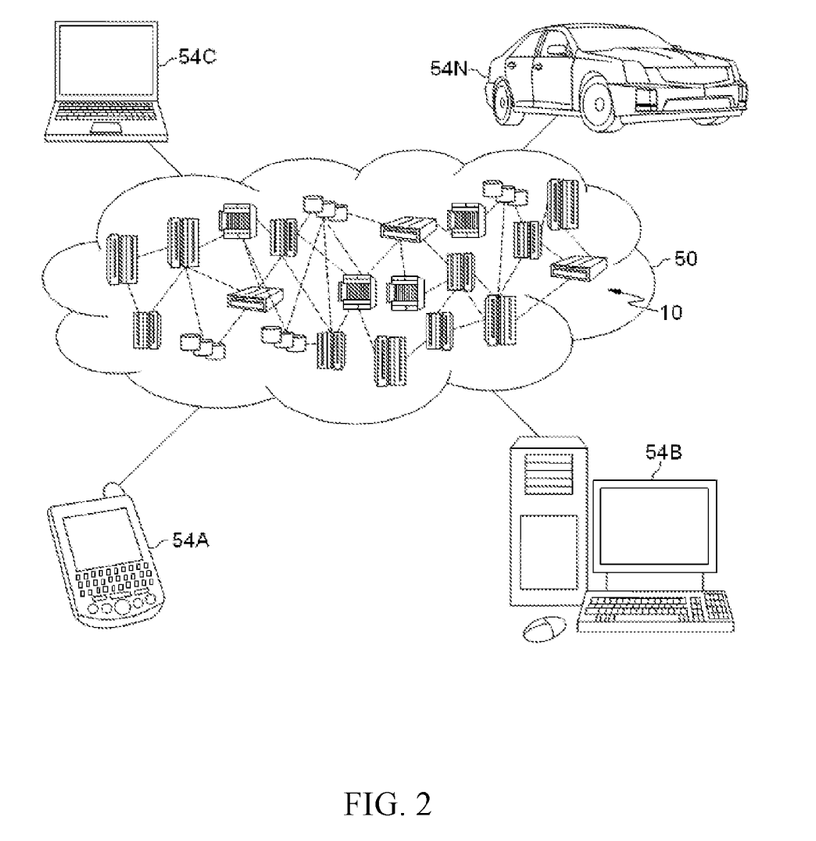
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
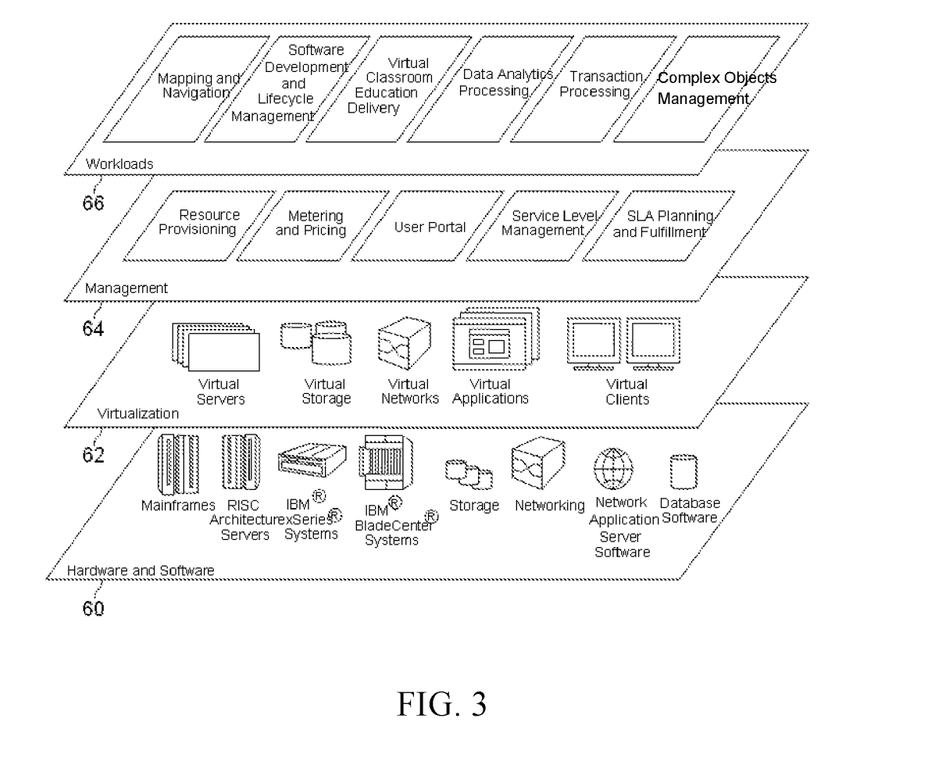
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and complex objects management based on embodiment of the invention.

Figure 4:
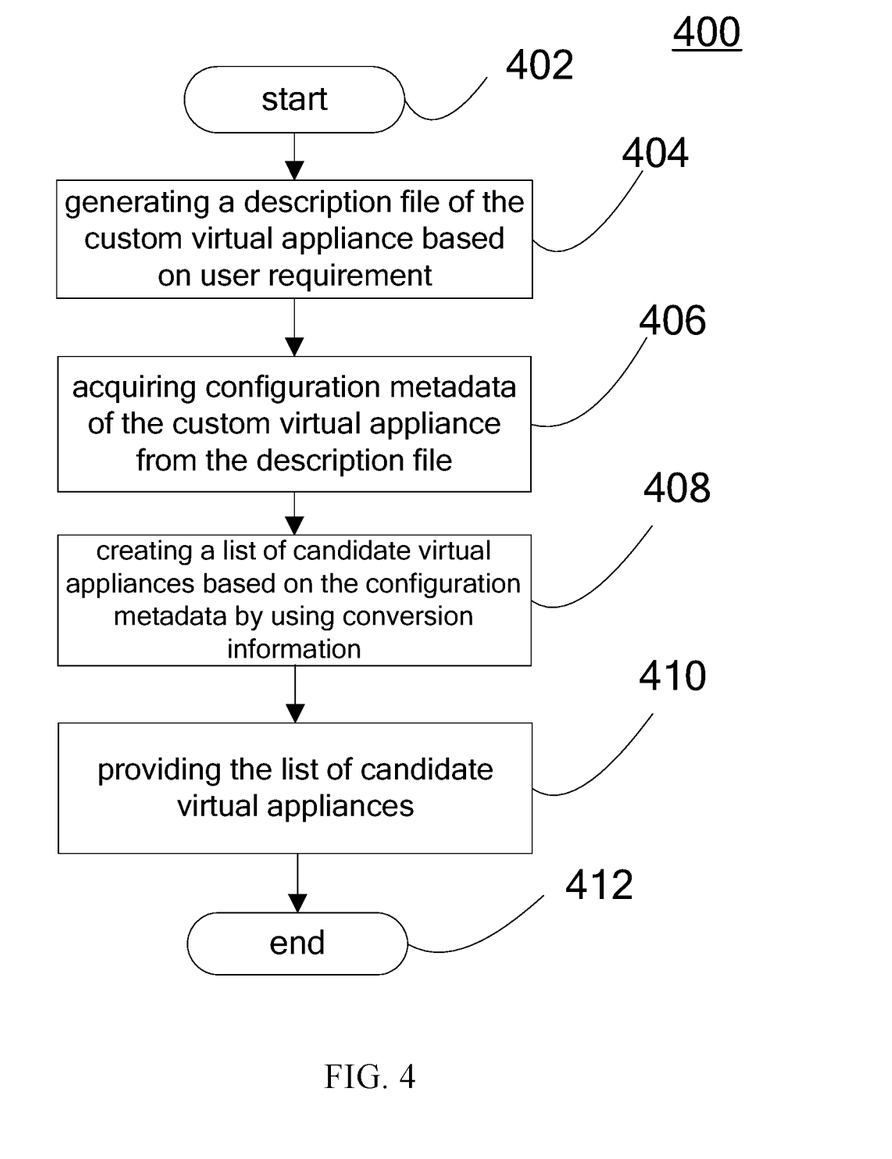
FIG. 4 depicts a flowchart of a method 400 for providing a custom virtual appliance according to an embodiment of the invention.

Detailed implementation manner of embodiments of the invention will be described below. FIG. 4 depicts a flowchart of a method 400 for providing a custom virtual appliance according to an embodiment of the invention. As shown in FIG. 4, the method 400 for providing a custom virtual appliance starts with step 402, comprising: step 404, generating a description file of the custom virtual appliance based on user requirement; step 406, acquiring configuration metadata of the custom virtual appliance from the description file; step 408, creating a list of candidate virtual appliances based on the configuration metadata by using conversion information, wherein a candidate virtual appliance in the list is capable of obtaining a configuration corresponding to the configuration metadata through conversion. The performance of each step above will be described below in conjunction with specific examples.

First, in step 404, generating a description file of the custom virtual appliance based on user requirement. Assuming that user requirement (i.e. a custom virtual appliance required by user) is: disk format of the virtual appliance is XEN VHD, the virtual appliance carries thereon Novell SUSE Linux Enterprise Server operating system whose version is 11, the operating system carries thereon IBM Web Sphere Application Server application software whose version is 7.0 and WASProfile(Standalone) instances. According to the method of the embodiment of the invention, the following description file of the custom virtual appliance is generated according to the above user requirement.

```
<ovf:File ovf:format="*.vhd" ovf:size="10240"/>
...
<ovf:ProductSection ovf:class="License" ovf:instance="1">
    <ovf:Info ovf:msgid="License.label">Licence Acceptance
    </ovf:Info>
    <ovf:Product>Novell SUSE Linux Enterprise Server</ovf:Product>
    <ovf:Version>11</ovf:Version>
    <ovf:Property ovf:key="accept" ovf:type="string"
ovf:userConfigurable="false" ovf:value="yes" ovf:required="false">
        <ovf:Label ovf:msgid="License.accept.label">Accept
        License</ovf:Label>
        <ovf:Description ovf:msgid="License.accept.description">
Yes/No that all licences are accepted</ovf:Description>
    </ovf:Property>
</ovf:ProductSection>
...
<ovf:ProductSection ovf:class="ConfigWAS" ovf:instance="1">
    <ovf:Info ovf:msgid="ConfigWAS.label">WebSphere runtime
configuration</ovf:Info>
        <ovf:Product>IBM WebSphere Application Server HyperVisor
Edition</ovf:Product>
        <ovf:Version>7.0</ovf:Version>
        <ovf:Property ovf:key="type" ovf:type="string"
ovf:userConfigurable="true" ovf:value="" ovf:required="true">
            <ovf:Label
ovf:msgid="ConfigWAS.type.label">WASProfile(Standlone)</ovf:Label>
            <ovf:Description ovf:msgid="ConfigWAS.type.description">
This is the type of profile created on this image</ovf:Description>
        </ovf:Property>
        ......
</ovf:ProductSection>
```

The above description file describes therein such a custom virtual appliance:

Disk format is XEN VHD, size is 10G; operating system is Novell SUSE Linux Enterprise Server Ver. 11; the carried application software is IBM WebSphere Application Server Ver. 7.0 and WASProfile(Standalone) instances. That is, the above description file corresponds to user requirement. It should be appreciated that, the above example is merely for illustration, and should not be construed as limit the protection scope of the invention.

Then, in step 406, acquiring configuration metadata of the custom virtual appliance from the description file. The configuration metadata corresponds to configuration information of the custom virtual appliance, and content of the configuration metadata may be acquired by extracting from the description file tags relevant to the configuration metadata, such as Product (product information) tag, Version (version) tag etc. Still taking the above example, configuration metadata of the custom virtual appliance is:

```
<ovf:File ovf:format="*.vhd" ovf:size="10240">
<ovf:Product>Novell SUSE Linux Enterprise Server</ovf:Product>
    <ovf:Version>11</ovf:Version>
<ovf:Product>IBM WebSphere Application Server HyperVisor
Edition</ovf:Product>
    <ovf:Version>7.0</ovf:Version>
<ovf:Label
ovf:msgid="ConfigWAS.type.label">WASProfile(Standlone)</ovf:Label>
```

Then, in step 408, creating a list of candidate virtual appliances based on the configuration metadata by using conversion information, wherein the list contains the virtual appliance capable of obtaining a configuration corresponding to the configuration metadata through conversion. First, conversion information is read, and the conversion information describes which configurations of a virtual appliance may be acquired through conversion. The conversion information may illustratively include at least one of: software customization conversion information describing which software customizations may be acquired through conversion and how to acquire through conversion in an identical software environment; disk format conversion information describing which disk formats may be acquired through conversion and how to acquire through conversion; and disk size conversion information describing how to acquire required disk size through conversion. An example of conversion information is illustratively given below.

```
<softwares>
    <software>
        <from>BPMProfile(Stanndalone)</from>
        <to>WASProfile(Stanndalone)</to>
        <convertCommand>removeBPMStandaloneProfile.sh</
        convertCommand>
        <convertCommand>createWASStandaloneProfile.sh</
        convertCommand>
    </software>
    <software>
        <from>BPMProfile(Stanndalone)</from>
        <to>WASProfile(deploymentmanager)</to>
        <convertCommand>removeBPMStandaloneProfile.sh</
        convertCommand>
        <convertCommand>createWASDeploymentManagerProfile.sh</
        convertCommand>
    </software>
    <software>
        <from>BPMProfile(deploymentmanager)</from>
        <to>WASProfile(Stanndalone)</to>
        <convertCommand>removeBPMDeploymentManagerProfile.sh</
        convertCommand>
        <convertCommand>createWASStandaloneProfile.sh</
        convertCommand>
    </software>
</softwares>
...
<vdformats>
    <vdformat>
        <from>VMware VMDK</from>
        <to>XEN VHD</to>
        <convertCommand>vmdk2vhd.sh</convertCommand>
    </vdformat>
    <vdformat>
        <from>XEN VHD</from>
        <to>VMware VMDK</to>
        <convertCommand>vhd2vmdk.sh</convertCommand>
    </vdformat>
    <vdformat>
        <from>VMware VMDK</from>
        <to>KVM QCOW2</to>
        <convertCommand>vmdk2qcow2.sh</convertCommand>
```

```
      </vdformat>
    </vdformats>
    ...
    <vdsizes>
      < convertRatio >
        <max>30%</max>
        <media>OS</ media >
      </ convertRatio >
      < convertRatio >
        <max>50%</max>
        <media>software</ media >
      </ convertRatio >
</ vdsizes >
```

By reading the conversion information given above, it can be learned that:

1) A BPMProfile(Standalone) instance may be converted into a WASProfile(Standalone) instance by executing commands removeBPMStandaloneProfile.sh and CreateWASStandaloneProfile.sh under identical software environment.

2) Disk with format VMWare VMDK may be converted into disk with format XEN VHD by executing a command vmdk2vhd.sh.

3) For operating system, the maximum compression ratio of a disk should not exceed 30%; for application software, the maximum compression ratio of a disk should not exceed 50%.

It should be appreciated that, the conversion information given above is merely for illustration, and should not be construed as limit the protection scope of the invention, and the conversion information is not limited to the above content and form.

Then, a list of candidate virtual appliances is created based on the conversion information and the configuration metadata, specifically, corresponding to different conversion information, different operations are performed to create the list of candidate virtual appliances.

If the conversion information is software customization conversion information, then software customization of the custom virtual appliance is acquired based on configuration metadata of the custom virtual appliance; for a certain virtual appliance: software customization of that virtual appliance is acquired; it is determined, based on the software customization conversion information, whether that virtual appliance may be made to have software customization of the custom virtual appliance by performing software customization conversion on that virtual appliance; if yes, that virtual appliance is placed into the list as candidate virtual appliance and required conversion is recorded.

Taking the custom virtual appliance given above for example, first, software customization of the custom virtual appliance is acquired based on configuration metadata of the custom virtual appliance, i.e., IBM WebSphere Application Server and WASProfile(Standalone) carried on Linux SUSE Enterprise Server operating system. Then, for a certain available virtual appliance, software customization of that virtual appliance is acquired, assuming that the acquired software customization of that virtual appliance is IBM Web Sphere Application Server and WASProfile(Standalone) carried on Linux SUSE Enterprise Server operating system. Then, it is determined, based on the software customization conversion information, whether that virtual appliance may be made to have software customization of the custom virtual appliance by performing software customization conversion on that virtual appliance. Based on the software customization conversion information given above, the determination result is yes, thus that virtual appliance is placed into the list as candidate virtual appliance and meanwhile, required conversion is recorded, i.e., conversion information described in the conversion information:

A BPMProfile(Standalone) instance is converted into a WASProfile(Standalone) instance by executing the following commands:

removeBPMStandaloneProfile.sh and CreateWASStandaloneProfile.sh.

If the conversion information is disk format conversion information, then disk format of the custom virtual appliance is acquired based on configuration metadata of the custom virtual appliance; for a certain virtual appliance in the list: disk format of that virtual appliance is acquired; it is determined, based on the disk format conversion information, whether that virtual appliance may be made to have disk format of the custom virtual appliance by performing disk format conversion on that virtual appliance; if yes, that virtual appliance is retained in the list as candidate virtual appliance and required conversion is recorded; if no, that virtual appliance is removed from the list.

Taking the custom virtual appliance given above for example, first, disk format of the custom virtual appliance is acquired based on configuration metadata of the custom virtual appliance, i.e., XEN VHD. Then, for a certain virtual appliance in the list, disk format of that virtual appliance is acquired, assuming that the acquired disk format of that virtual appliance is VMWare VMDK. Then, it is determined, based on the disk format conversion information, whether that virtual appliance may be made to have disk format of the custom virtual appliance by performing disk format conversion on that virtual appliance. Based on the disk format conversion information given above, the determination result is yes, thus that virtual appliance is retained in the list as candidate virtual appliance and meanwhile, required conversion is recorded, i.e., conversion information described in the conversion information:

Disk with format VMWare VMDK is converted into disk with format XEN VHD by executing the following command:

vmdk2vhd.sh.

If the conversion information is disk size conversion information, then disk size of the custom virtual appliance is acquired based on configuration metadata of the custom virtual appliance; for a certain virtual appliance in the list: disk size of that virtual appliance is acquired; it is determined, based on the disk format conversion information, whether that virtual appliance may be made to have disk size of the custom virtual appliance by performing disk size conversion on that virtual appliance; if yes, that virtual appliance is retained in the list as candidate virtual appliance and required conversion is recorded; if no, that virtual appliance is removed from the list.

Taking the custom virtual appliance given above for example, first, disk size of the custom virtual appliance is acquired based on configuration metadata of the custom virtual appliance, i.e., 10G. Then, for a certain virtual appliance in the list, disk size of that virtual appliance is acquired. Then, it is determined, based on the disk size conversion information, whether that virtual appliance may be made to have disk size of the custom virtual appliance by performing disk size conversion on that virtual appliance. Assuming according to the disk size conversion information given above, the determination result is yes, then that virtual appliance is retained in the list as candidate virtual appliance and meanwhile, required conversion is recorded. Assuming according to the disk size conversion information given above, the determination result is no, then that virtual appliance is removed from the list.

It should be appreciated that, the above description is merely for illustration, those skilled in the art can make changes thereon which still fall into the concept of the invention. For example, the order of performing determination based on conversion information may be changed, for example, first, for a certain available virtual appliance, disk format and/or disk size of that virtual appliance is acquired; it is determined, based on disk format conversion information and/or disk size conversion information, whether that virtual appliance may be made to have disk format and/or disk size of the custom virtual appliance by performing disk format conversion and/or disk size conversion on that virtual appliance; if yes, that virtual appliance is placed in the list as candidate virtual appliance and required conversion is recorded. Then, for a certain virtual appliance in the list, software customization of that virtual appliance is acquired; it is determined, based on software customization conversion information, whether that virtual appliance may be made to have software customization of the custom virtual appliance by performing software customization conversion on that virtual appliance; if yes, that virtual appliance is retained in the list as candidate virtual appliance and required conversion is recorded; if no, that virtual appliance is removed from the list.

According to another embodiment of the invention, the method for providing a custom virtual appliance may further comprise: step 410, providing the list of candidate virtual appliances, such that a user is capable of downloading and constructing the custom virtual appliance via the candidate virtual appliance in the list. As mentioned above, a candidate virtual appliance in the list is capable of acquiring configuration corresponding to the configuration metadata through conversion. Thus, by reading candidate virtual appliances recorded in the list and the required conversion thereof, a user is capable of performing required conversion and downloading of the candidate virtual appliance to construct a custom virtual appliance.

Figure 5:
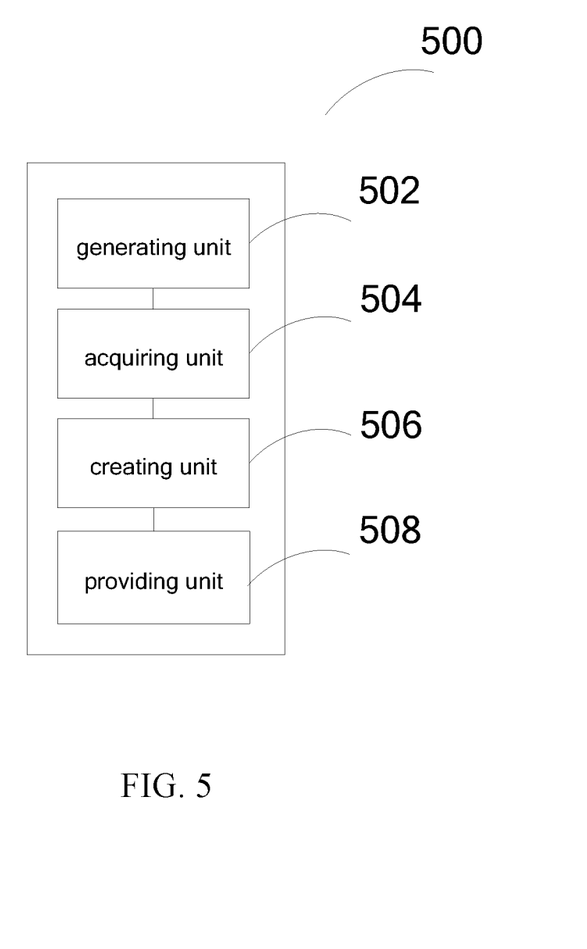
FIG. 5 depicts a block diagram of a device 500 for providing a custom virtual appliance according to an embodiment of the invention.

FIG. 5 depicts a block diagram of a device 500 for providing a custom virtual appliance according to an embodiment of the invention. As shown in FIG. 5, the device 500 for providing a custom virtual appliance comprising: a generating unit 502 configured to generate a description file of the custom virtual appliance based on user requirement; an acquiring unit 504 configured to acquire configuration metadata of the custom virtual appliance from the description file; a creating unit 506 configured to create a list of candidate virtual appliances based on the configuration metadata by using conversion information, wherein a candidate virtual appliance in the list is capable of obtaining a configuration corresponding to the configuration metadata through conversion.

According to an embodiment of the invention, the conversion information comprises at least one of: software customization conversion information describing which software customizations may be acquired through conversion and how to acquire through conversion in an identical software environment; disk format conversion information describing which disk formats may be acquired through conversion and how to acquire through conversion; and disk size conversion information describing how to acquire required disk size through conversion.

According to an embodiment of the invention, the conversion information comprises software customization conversion information, the creating unit 506 is further configured to: acquire software customization of the custom virtual appliance based on configuration metadata of the custom virtual appliance; for a certain available virtual appliance: acquire software customization of that virtual appliance; determine, based on the software customization conversion information, whether that virtual appliance may be made to have software customization of the custom virtual appliance by performing software customization conversion on that virtual appliance; place a virtual appliance whose determination result is yes into the list as candidate virtual appliance and record required conversion.

According to another embodiment of the invention, the conversion information further comprises disk format conversion information, the creating unit 506 is further configured to: acquire disk format of the custom virtual appliance based on configuration metadata of the custom virtual appliance; for a certain virtual appliance in the list: acquire disk format of that virtual appliance; determine, based on the disk format conversion information, whether that virtual appliance may be made to have disk format of the custom virtual appliance by performing disk format conversion on that virtual appliance; if yes, retain that virtual appliance in the list as candidate virtual appliance and record required conversion; if no, remove that virtual appliance from the list.

According to another embodiment of the invention, the conversion information further comprises disk size conversion information, the creating unit 506 is further configured to: acquire disk size of the custom virtual appliance based on configuration metadata of the custom virtual appliance; for a certain virtual appliance in the list: acquire disk size of that virtual appliance; determine, based on the disk size conversion information, whether that virtual appliance may be made to have disk size of the custom virtual appliance by performing disk size conversion on that virtual appliance; if yes, retain that virtual appliance in the list as candidate virtual appliance and record required conversion; if no, remove that virtual appliance from the list.

According to another embodiment of the invention, the device 500 for providing a custom virtual appliance further comprising: a providing unit 508 configured to provide the list such that a user is capable of downloading and constructing the custom virtual appliance via the candidate virtual appliance in the list. Since a candidate virtual appliance in the list is capable of obtaining configuration corresponding to the configuration metadata through conversion, therefore, by reading candidate virtual appliances recorded in the list and the required conversion thereof, a user is capable of performing required conversion and downloading of the candidate virtual appliance to construct a custom virtual appliance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Thus, it is desired to improve existing solutions to be able to provide a custom virtual appliance.

Illustrative embodiments of the invention provide a method for providing a custom virtual appliance, comprising: generating a description file of the custom virtual appliance based on user requirement; acquiring configuration metadata of the custom virtual appliance from the description file; creating a list of candidate virtual appliances based on the configuration metadata by using conversion information, wherein a candidate virtual appliance in the list is capable of obtaining a configuration corresponding to the configuration metadata through conversion.

Illustrative embodiments of the invention also provide a device for providing a custom virtual appliance, comprising: a generating unit configured to generate a description file of the custom virtual appliance based on user requirement; an acquiring unit configured to acquire configuration metadata of the custom virtual appliance from the description file; a creating unit configured to create a list of candidate virtual appliances based on the configuration metadata by using conversion information, wherein a candidate virtual appliance in the list is capable of obtaining a configuration corresponding to the configuration metadata through conversion.

With the method and device of the illustrative embodiments, a custom virtual appliance may be provided by using virtual appliances provided in a data center based on user requirement, so as to better meet requirements of different users.

The invention relates to virtual appliances, and discloses a method and system for providing a custom virtual appliance, the method comprising: generating a description file of the custom virtual appliance based on user requirement; acquiring configuration metadata of the custom virtual appliance from the description file; creating a list of candidate virtual appliances based on the configuration metadata by using conversion information, wherein a candidate virtual appliance in the list is capable of obtaining a configuration corresponding to the configuration metadata through conversion. With the method of the invention, user is enabled to customize a virtual appliance.

What is claimed is:

1. A method for providing a custom virtual appliance, the method comprising:
   generating, by one or more processors, a description file of a custom virtual appliance based on a user requirement;
   acquiring, by the one or more processors, configuration metadata of the custom virtual appliance from the description file;
   creating, by the one or more processors, a list of candidate virtual appliances based on the configuration metadata by using conversion information, wherein candidate virtual appliances in the list of candidate virtual appliances are capable of converting to a configuration that corresponds to the configuration metadata;
   acquiring, by the one or more processors, a disk size of the custom virtual appliance based on the configuration metadata of the custom virtual appliance; and
   for a specific virtual appliance in the list:
      acquiring, by the one or more processors, a disk size of the specific virtual appliance; and
      determining, by the one or more processors and based on disk size conversion information, whether the specific virtual appliance is required to convert a disk size of the custom virtual appliance by performing a disk size conversion on the specific virtual appliance; and
   in response to determining that a candidate virtual appliance from the list of candidate virtual appliances is required to convert a virtual disk on the candidate virtual appliance using the disk size conversion information, downloading and constructing, by the one or more processors, the candidate virtual appliance as the custom virtual appliance.

2. The method according to claim 1, wherein the conversion information for the specific virtual appliance comprises at least one of software customization conversion information, disk format conversion information, and the disk size conversion information.

3. The method according to claim 1, wherein the conversion information comprises software customization conversion information, and wherein the method further comprises:
   acquiring, by the one or more processors, a software customization of the custom virtual appliance based on the configuration metadata of the custom virtual appliance; and
   for the specific available virtual appliance:
      acquiring, by the one or more processors, customization software for the specific available virtual appliance;
      determining, by the one or more processors and based on conversion information for the customization software, whether the specific available virtual appliance is required to be customized using the customization software;
      in response to determining that the specific available virtual appliance is required to be customized using the customization software, placing, by the one or more processors, the specific available virtual appliance into the list as a candidate converted virtual appliance; and
      recording, by the one or more processors, a required conversion process for converting the specific available virtual appliance into the custom virtual appliance.

4. The method according to claim 1, wherein the conversion information further comprises disk format conversion information, and wherein the method further comprises:
   acquiring, by the one or more processors, a disk format of the custom virtual appliance based on the configuration metadata of the custom virtual appliance; and
   for the specific virtual appliance:
      acquiring, by the one or more processors, a disk format of the specific virtual appliance;
      determining, by the one or more processors and based on the disk format conversion information, whether the specific virtual appliance is required to convert a virtual disk on the specific virtual appliance using the disk format conversion information;
      in response to determining that the specific virtual appliance is required to convert the virtual disk on the specific virtual appliance using the disk format conversion information, retaining, by the one or more processors, the specific virtual appliance in the list as a candidate virtual appliance; and
      recording, by the one or more processors, a required conversion process for converting the virtual disk to a converted virtual disk.

5. A computer program product for providing a custom virtual appliance, the computer program product comprising a computer readable storage medium having program code embodied therewith, wherein the computer readable storage medium is not a transitory signal per se, and wherein the program code is readable and executable by a processor to perform a method comprising:
   generating a description file of a custom virtual appliance based on a user requirement;
   acquiring configuration metadata of the custom virtual appliance from the description file;
   creating a list of candidate virtual appliances based on the configuration metadata by using conversion information, wherein candidate virtual appliances in the list of candidate virtual appliances are capable of converting to a configuration that corresponds to the configuration metadata;

acquiring a disk size of the custom virtual appliance based on the configuration metadata of the custom virtual appliance; and for a specific virtual appliance in the list:
  acquiring a disk size of the specific virtual appliance; and
  determining, based on disk size conversion information, whether the specific virtual appliance is required to convert a disk size of the custom virtual appliance by performing a disk size conversion on the specific virtual appliance; and
  in response to determining that a candidate virtual appliance from the list of candidate virtual appliances is required to convert a virtual disk on the candidate virtual appliance using the disk size conversion information, downloading and constructing the candidate virtual appliance as the custom virtual appliance.

6. The computer program product according to claim 5, wherein the conversion information for the specific virtual appliance comprises at least one of software customization conversion information, disk format conversion information, and the disk size conversion information.

7. The computer program product according to claim 5, wherein the conversion information comprises software customization conversion information, and wherein the method further comprises:
  acquiring a software customization of the custom virtual appliance based on the configuration metadata of the custom virtual appliance; and
  for the specific available virtual appliance:
    acquiring customization software for the specific available virtual appliance;
    determining, based on conversion information for the customization software, whether the specific available virtual appliance is required to be customized using the customization software;
    in response to determining that the specific available virtual appliance is required to be customized using the customization software, placing the specific available virtual appliance into the list as a candidate converted virtual appliance; and
    recording a required conversion process for converting the specific available virtual appliance into the custom virtual appliance.

8. The computer program product method according to claim 5, wherein the conversion information further comprises disk format conversion information, and wherein the method further comprises:
  acquiring a disk format of the custom virtual appliance based on the configuration metadata of the custom virtual appliance; and
  for the specific virtual appliance:
    acquiring a disk format of the specific virtual appliance;
    determining, based on the disk format conversion information, whether the specific virtual appliance is required to convert a virtual disk on the specific virtual appliance using the disk format conversion information;
    in response to determining that the specific virtual appliance is required to convert the virtual disk on the specific virtual appliance using the disk format conversion information, retaining the specific virtual appliance in the list as a candidate virtual appliance; and
    recording a required conversion process for converting the virtual disk to a converted virtual disk.

9. A computer system comprising:
  a hardware processor, a computer readable memory, and a computer readable storage medium;
  first program instructions to generate a description file of a custom virtual appliance based on a user requirement;
  second program instructions to acquire configuration metadata of the custom virtual appliance from the description file;
  third program instructions to create a list of candidate virtual appliances based on the configuration metadata by using conversion information, wherein candidate virtual appliances in the list of candidate virtual appliances are capable of converting to a configuration that corresponds to the configuration metadata;
  fourth program instructions to acquire a disk size of the custom virtual appliance based on the configuration metadata of the custom virtual appliance; and
  fifth program instructions to, for a specific virtual appliance in the list:
    acquire a disk size of the specific virtual appliance; and
    determine, based on disk size conversion information, whether the specific virtual appliance is required to convert a disk size of the custom virtual appliance by performing a disk size conversion on the specific virtual appliance; and
  sixth program instructions to, in response to determining that a candidate virtual appliance from the list of candidate virtual appliances is required to convert a virtual disk on the candidate virtual appliance using the disk size conversion information, download and construct the candidate virtual appliance as the custom virtual appliance; and wherein
  the first, second, third, fourth, fifth, and sixth program instructions are stored on the computer readable storage medium and executed by the processor via the computer readable memory.

10. The computer system of claim 9, wherein the conversion information for the specific virtual appliance comprises at least one of software customization conversion information, disk format conversion information, and the disk size conversion information.

11. The computer system of claim 9, wherein the conversion information comprises software customization conversion information, and wherein the computer system further comprises:
  seventh program instructions to acquire a software customization of the custom virtual appliance based on the configuration metadata of the custom virtual appliance; and
  eighth program instructions to, for the specific available virtual appliance:
    acquire customization software for the specific available virtual appliance;
    determine, based on conversion information for the customization software, whether the specific available virtual appliance is required to be customized using the customization software;
    in response to determining that the specific available virtual appliance is required to be customized using the customization software, place the specific available virtual appliance into the list as a candidate converted virtual appliance; and
    record a required conversion process for converting the specific available virtual appliance into the custom virtual appliance; and wherein the seventh and eighth program instructions are stored on the computer readable storage medium and executed by the processor via the computer readable memory.

12. The computer system of claim 9, wherein the conversion information further comprises disk format conversion information, and wherein the computer system further comprises: seventh program instructions to acquire a disk format of the custom virtual appliance based on the configuration metadata of the custom virtual appliance; and    eighth program instructions to, for the specific virtual appliance:
     acquire a disk format of the specific virtual appliance;
     determine, based on the disk format conversion information, whether the specific virtual appliance is required to convert a virtual disk on the specific virtual appliance using the disk format conversion information;
     in response to determining that the specific virtual appliance is required to convert the virtual disk on the specific virtual appliance using the disk format conversion information, retaining the specific virtual appliance in the list as a candidate virtual appliance; and
     record a required conversion process for converting the virtual disk to a converted virtual disk; and wherein the seventh and eighth program instructions are stored on the computer readable storage medium and executed by the processor via the computer readable memory.

* * * * *